United States Patent [19]
Nakano et al.

[11] 3,924,863
[45] Dec. 9, 1975

[54] GASKET

[75] Inventors: Soichi Nakano; Yoshitoku Iizuka, both of Saitama, Japan

[73] Assignee: Honda Giken Kogyo Kabushiki Kaisha, Tokyo, Japan

[22] Filed: Dec. 10, 1974

[21] Appl. No.: 531,311

[30] Foreign Application Priority Data
Dec. 11, 1973 Japan............................ 48-137359

[52] U.S. Cl............ 277/235 B; 60/282; 123/32 ST; 277/26
[51] Int. Cl.².......................................... F16J 15/12
[58] Field of Search............ 60/282, 289; 123/32 ST, 123/75 B; 277/26, 235 B

[56] References Cited
UNITED STATES PATENTS

| | | | |
|---|---|---|---|
| 1,781,365 | 11/1930 | Burgmann | 277/235 B |
| 1,903,990 | 4/1933 | Fitzgerald | 277/235 B |
| 2,157,102 | 5/1939 | Victor et al. | 277/235 B |
| 2,210,453 | 8/1940 | Ginn | 277/235 B |
| 3,853,097 | 12/1974 | Kume | 123/32 ST |

*Primary Examiner*—Robert I. Smith
*Attorney, Agent, or Firm*—Lyon & Lyon

[57] ABSTRACT

A gasket is provided for use between a relatively cool cylinder head of an internal combustion engine and a relatively hot manifold receiving hot exhaust gases from the engine. The gasket is constructed of three plates: the center plate is formed of insulation material such as asbestos, one side plate being formed of copper or aluminum or other metal having a relatively high coefficient of thermal expansion, and the other side plate being formed of steel or stainless steel or other metal having a relatively low coefficient. The side plate with the high coefficient is placed against the engine head, and the side plate with the low coefficient is placed against the manifold, to prevent undesirable differential expansion of the side plates leading to gas leakage between the plates.

10 Claims, 4 Drawing Figures

GASKET

This invention relates to a gasket interposed between the surfaces having a comparatively large temperature difference in internal combustion piston engines and is particularly directed to one for engines of this type which employ a reactor in the exhaust system to complete the oxidation of unburned hydrocarbons in the engine exhaust gases. The heat generated in the reactor by the continuing oxidation of the unburned hydrocarbons adds to the heat already present in the exhaust gases with the result that the manifold having exhaust passages leading from the engine becomes very hot. A gasket is clamped between this very hot manifold and the relatively cool cylinder head of the engine, which cylinder head is water cooled. The significant difference in temperature which develops during operation of the engine causes one side of the gasket to expand to an extent greater than the other side. Repeated differential expansion which occurs from cold start to full load and the reverse effect which occurs when the engine is shut off and allowed to cool down causes "peeling" and separation of the plates of the gasket and results in gas leakage.

This invention overcomes such undesirable effects by minimizing the differential expansion and contraction between the metal plates which make up the opposite surfaces of the gasket. The plate which contacts the relatively cool cylinder head of the engine is made of a metal having a relatively high coefficient of thermal expansion, for example, copper or aluminum. The plate on the other side of the gasket which contacts the hot manifold is made of a metal having a relatively low coefficient of thermal expansion, for example, steel or stainless steel.

Other and more detailed objects and advantages will appear hereinafter.

Figure 1:
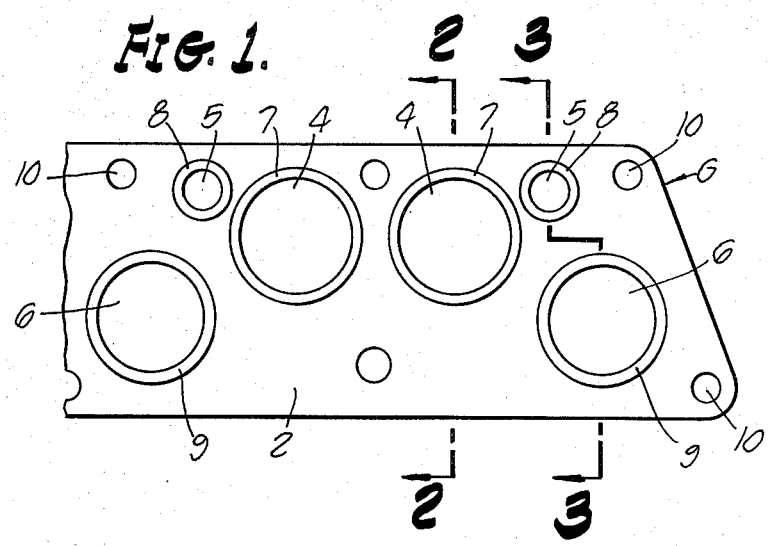
FIG. 1 is a plan view partly broken away showing a preferred embodiment of this invention.
Figure 2:
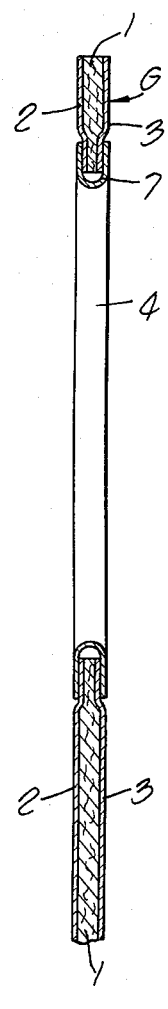
FIG. 2 is a sectional view partly broken away taken substantially on the lines 2—2 as shown in FIG. 1.
Figure 3:
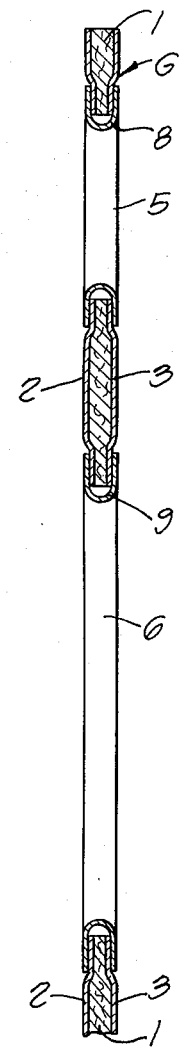
FIG. 3 is a sectional view partly broken away taken substantially on the lines 3—3 as shown in FIG. 1.
Figure 4:
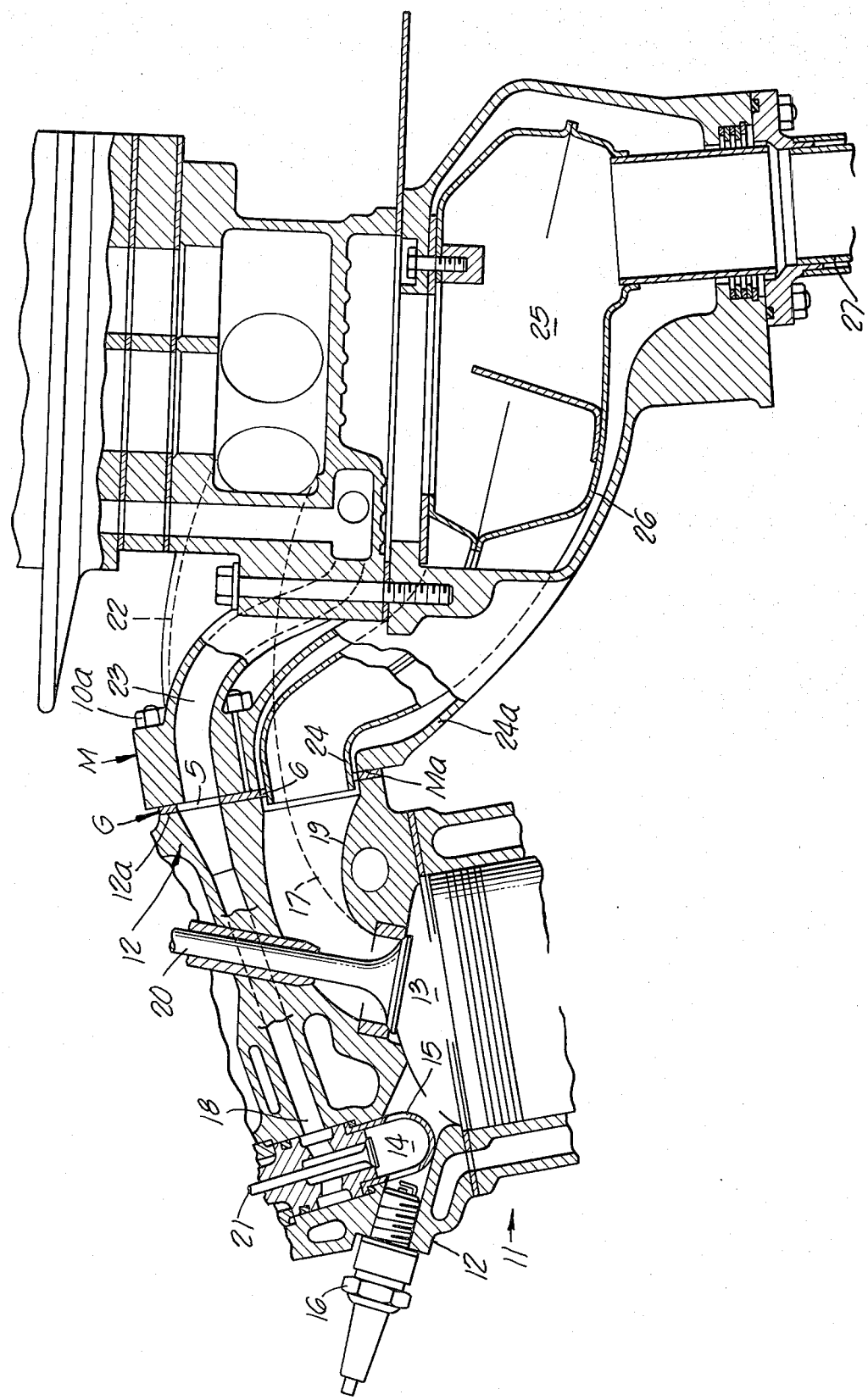
FIg. 4 is a sectional elevation partly broken away showing an internal combustion engine assembly employing this invention.

Referring to the drawings, the gasket G embodying this invention is formed by bonding a metal plate 2 to one side of an asbestos or other heat-insulating plate 1, and bonding a metal plate 3 to the other side thereof. The metal plate 2 is formed of aluminum, copper or other metal having a comparatively large coefficient of thermal expansion, while the metal plate 3 is formed of steel, stainless steel or other metal having a comparatively low coefficient of thermal expansion. The gasket G is adapted to be positioned at the joint between the water cooled cylinder head 12 and the manifold assembly M which includes the intake passages 22 and 23 and exhaust passages 24 within the exhaust housing 24a, as described below.

The gasket G is provided with main intake holes 4 and auxiliary intake holes 5 which are aligned with the main intake passages 17 and auxiliary intake passages 18 in the cylinder head 12. The gasket G also has exhaust holes 6 which are aligned with the exhaust passages 19 in the head 12. The intake holes 4 and 5 in the gasket G are also aligned with the main intake passages 22, the auxiliary intake passages 23, respectively, in the manifold assembly M. The exhaust holes 6 in the gasket G are also aligned with the exhaust passages 24 leading to the reactor chamber 25. Grommets 7 and 8 made of copper or other material having a comparatively high coefficient of thermal expansion are fitted around the periphery of the main intake holes 4 and auxiliary intake holes 5. Similarly, grommets 9 made of steel or other material having a comparatively low coefficient of thermal expansion are fitted around the periphery of the exhaust holes 6.

The internal combustion engine 11 has a plurality of main combustion chambers 13 each with an auxiliary combustion chamber 14 connected thereto by means of a torch opening 15. During the suction stroke of the piston, a lean mixture supplied by the main carburetor (not shown) is drawn into the main combustion chamber 13 through the main intake passage 17 and intake valve 20. At the same time, rich mixture supplied by an auxiliary carburetor (not shown) is drawn into the auxiliary combustion chamber 14 through the auxiliary intake passage 18 and auxiliary valve 21. At the end of the compression stroke the spark plug 16 ignites the mixture in the auxiliary chamber 14 and causes a torch flame to extend through the torch opening 15 to ignite the mixtures in the main combustion chamber 13. Since only a small quantity of rich mixture is supplied as compared to a large quantity of lean mixture, the overall or total mixture is leaner than the stoichiometric ratio.

The gasket G is positioned so that the metal plate 2 having the high coefficient of thermal expansion faces the contact surface 12a on the engine head 12 and so that the metal plate 3 having the low coefficient of thermal expansion faces the contact surface Ma of the manifold assembly M.

An expansion chamber or reactor 25 is formed within the liner 26. This liner 26 receives hot exhaust gases transmitted through the individual exhaust passages 24 and the liner is enclosed within the exhaust housing 24a. Exhaust gases from the main combustion chambers flow past the exhaust valves 20 and exhaust passages 19, through the gasket holes 6 and through the exhaust passages 24 into the interior of the reactor 25. Unburned components of the exhaust gases burn inside the reactor 25 before being discharged into the atmosphere through exhaust pipe 27 and silencer (not shown). High temperature is developed in the reactor chamber 25 because the hot exhaust gases contain unburned hydrocarbons which oxidize in the excess air to increase the temperature in the reactor. Excess air is present because the overall mixture delivered to the combustion chambers is leaner than the stoichiometric ratio.

Since the high temperature exhaust gases flow into the exhaust passages 24 and since the unburned components continue the combustion process inside the reactor 25, the liner 26 forming the outer wall of the reactor 25 is heated to a very high temperature. In this way, a significant temperature difference is produced between the contact surfaces 12a and Ma on opposite sides of the gasket G. But since the metal plate 2 made of copper or other metal having a high coefficient of thermal expansion faces the contact surface 12a of the relatively low temperature cylinder head 12 (which is water cooled), and since the metal plate 3 made of steel or other material having a low coefficient of thermal expansion faces the contact surfaces Ma of the high temperature exhaust system, the difference in thermal expansion on opposite sides of the gasket G is minimized. If the metal plates 2 and 3 of the gasket G were made of the same material, the plate next to the relatively hot manifold assembly M would expand to a greater extent than the plate next to the relatively cool cylinder head 12. Such differential thermal expansion would have a deleterious effect on the gasket G since separation or "peeling" between the metal plates 2, 3 and the heat-insulating plate 1 would result in gas leakage between the plates.

The grommets 7 and 8 fitted at the intake holes 4 and 5 of the gasket G are made from material having a high coefficient of thermal expansion. On the other hand, the grommets 9 which are fitted at the exhaust holes 6 of the gasket G are made from material having a low coefficient of thermal expansion. In this way, damaging of the grommets due to the heat load can be minimized.

Threaded fastenings 10a serve to clamp the gasket G between the surface 12a of the engine head 12 and the surface Ma on the manifold assembly. These threaded fastenings pass through the openings 10 in the gasket G.

Having fully described our invention, it is to be understood that our invention is not limited to the details herein set forth, but that our invention is of the full scope of the appended claims.

We claim:

1. A gasket for an internal combustion piston engine having confronting relatively hot and cold contact surfaces comprising, in combination: A first plate formed of insulated material, a second plate formed of metal having a relatively high coefficient of thermal expansion, a third plate formed of metal having a relatively low coefficient of thermal expansion, said first plate being positioned between said second and third plates, said second plate being adapted to contact the relatively cold contact surface of the engine and said third plate being adapted to contact the relatively hot contact surface of the engine.

2. The combination set forth in claim 1 in which the cold surface is formed on a cylinder head of the engine and the hot surface is formed on a manifold through which hot exhaust gases pass from the engine.

3. In a gasket for use between the cylinder head and the manifold assembly of an internal combustion piston engine, the manifold assembly including passages for hot exhaust gases from the engine and leading to a reactor chamber for oxidizing unburned hydrocarbons, the gasket comprising, in combination: a first plate formed of insulation material, a second plate formed of metal having a relatively high coefficient of thermal expansion, a third plate formed of metal having a relatively low coefficient of thermal expansion, said first plate being positioned between said second and third plates, said second plate being adapted to contact the relatively cool engine head, and said third plate being adapted to contact the relatively hot manifold assembly, and all plates of the gasket having aligned holes through which hot exhaust gases may pass from the engine head to the manifold assembly and reactor chamber.

4. The combination set forth in claim 3 in which said second plate is formed of copper.

5. The combination set forth in claim 3 in which said second plate is formed of aluminum.

6. The combination set forth in claim 3 in which said third plate is formed of steel.

7. The combination set forth in claim 3 in which said third plate is formed of stainless steel.

8. The combination set forth in claim 3 in which said second plate is formed of copper and said third plate is formed of stainless steel.

9. In a gasket for use between the cylinder head and the manifold assembly of an internal combustion piston engine, the manifold assembly including intake passages and including exhaust passages leading to a reactor chamber for oxidizing unburned hydrocarbons, the gasket comprising, in combination: a first plate formed of insulation material, a second plate formed of metal having a relatively high coefficient of thermal expansion, a third plate formed of metal having a relatively low coefficient of thermal expansion, said first plate being positioned between said second and third plates, said second plate being adapted to contact the relatively cool engine head, and said third plate being adapted to contact the relatively hot manifold assembly, and the plates of the gasket having aligned holes through which the intake mixtures and exhaust gases may pass.

10. The combination set forth in claim 9 in which said holes for the intake mixtures contain grommets made of material having a relatively high coefficient of thermal expansion, and the holes for the exhaust gases contain grommets made from material having a relatively low coefficient of thermal expansiom.

* * * * *